United States Patent [19]

Keogh

[11] 4,434,272
[45] Feb. 28, 1984

[54] WATER-CURABLE, SILANE MODIFIED ALKYL ACRYLATE COPOLYMERS AND A PROCESS FOR THE PREPARATION THEREOF

[75] Inventor: Michael J. Keogh, Bridgewater, N.J.

[73] Assignee: Union Carbide Corporation, Danbury, Conn.

[21] Appl. No.: 351,212

[22] Filed: Feb. 22, 1982

Related U.S. Application Data

[63] Continuation-in-part of Ser. No. 192,319, Sep. 30, 1980, Pat. No. 4,328,323, which is a continuation-in-part of Ser. No. 70,785, Aug. 29, 1979, Pat. No. 4,291,136, which is a continuation-in-part of Ser. No. 892,153, Mar. 31, 1978, abandoned.

[51] Int. Cl.$^3$ .................. C08L 25/14; C08L 27/22; C08L 33/08; C08L 33/10
[52] U.S. Cl. .................. 525/100; 525/104; 525/106
[58] Field of Search .................. 525/100, 104, 106

[56] References Cited

U.S. PATENT DOCUMENTS

| 3,193,567 | 7/1965 | Rossmy | 528/10 |
|---|---|---|---|
| 3,267,083 | 8/1966 | Imhof | 525/330.2 |
| 3,408,420 | 10/1968 | Wiggill | 525/102 |
| 3,441,545 | 4/1969 | Blatz et al. | 525/340 |
| 3,644,566 | 2/1972 | Kincheloe et al. | 525/101 |
| 3,646,155 | 2/1972 | Scott | 525/288 |
| 3,776,977 | 12/1973 | Chadha | 525/100 |
| 3,779,952 | 12/1973 | Leonard, Jr. | 521/64 |
| 4,146,585 | 3/1979 | Ward et al. | 525/104 |
| 4,291,136 | 9/1981 | Keogh | 525/102 |
| 4,328,323 | 5/1982 | Keogh | 525/106 |
| 4,343,917 | 8/1982 | Keogh | 525/106 |

FOREIGN PATENT DOCUMENTS 4752 3/1979 European Pat. Off.

Primary Examiner—Wilbert J. Briggs, Sr.
Attorney, Agent, or Firm—James C. Arvantes

[57] ABSTRACT

This invention relates to water-curable, silane modified copolymers of an alkyl acrylate and a monomer having the formula:

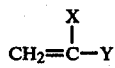

wherein X is hydrogen or chlorine and Y is chlorine, a phenyl radical or cyano. The water-curable, silane modified copolymers have enhanced properties which makes them suitable for use as extrudates, serving as jacketing and insulation about wire and cables.

28 Claims, No Drawings

WATER-CURABLE, SILANE MODIFIED ALKYL ACRYLATE COPOLYMERS AND A PROCESS FOR THE PREPARATION THEREOF

This application is a continuation-in-part of copending application Ser. No. 192,319 filed Sept. 30, 1980 now U.S. Pat. No. 4,328,323 granted May 4, 1982, which in turn is a continuation-in-part of application Ser. No. 70,785 filed Aug. 29, 1979, now U.S. Pat. No. 4,291,136 granted Sept. 22, 1981, which in turn is a continuation-in-part of application Ser. No. 892,153 filed Mar. 31, 1978, now abandoned.

SUMMARY OF THE INVENTION

This invention relates to water-curable, silane modified alkyl acrylate copolymers, prepared by the reaction of a mixture containing a monomeric silane or a polysiloxane and a copolymer of an alkyl acrylate and a copolymerizable monomer having the formula:

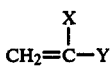

wherein X is hydrogen or chlorine and Y is chlorine, a phenyl radical or cyano. The silane modified alkyl acrylate copolymers of the present invention can be extruded about electrical conductors such as wire and cable, and if so desired water-cured to crosslinked products, providing insulation or jacketing thereon having improved properties.

BACKGROUND OF THE INVENTION

Water-curable, silane modified alkylene-alkyl acrylate copolymers and a process for the preparation thereof by reacting a mixture containing an alkylene-alkyl acrylate copolymer and a monomeric silane or a polysiloxane are described in detail in my U.S. Pat. No. 4,291,136 and in my copending application Ser. No. 192,319 filed Sept. 30, 1980 now U.S. Pat. No. 4,328,323, respectively, the disclosures of which are incorporated herein by reference. The silane modified alkylene-alkyl acrylate copolymers can be extruded about electrical conductors such as wire and cable, and if so desired water-cured to crosslinked products, providing insulation or jacketing thereon of excellent quality.

It is customary, prior to extruding the water-curable, silane modified alkylene-alkyl acrylate copolymers about electrical conductors, to add thereto various additives for the purpose of modifying and enhancing the ultimate properties of the coating, i.e., insulation or jacketing, such as flame retardancy, oil resistance, toughness and the like. Obviously, the modification of the water-curable, silane modified alkylene-alkyl acrylate copolymers by the addition thereto of various additives requires an additional processing step with an attendant increase in the overall cost of producing extruded articles.

DESCRIPTION OF THE INVENTION

The present invention provides for water-curable, silane modified alkyl acrylate copolymers which can be prepared by the reaction of a mixture containing a monomeric silane or a polysiloxane and a copolymer of an alkyl acrylate and a monomer having the formula:

Formula I wherein X is hydrogen or chlorine and Y is chlorine, a phenyl radical or cyano.

The properties of the water-curable, silane modified alkyl acrylate copolymers of this invention can be modified and enhanced by judicious selection of the monomer, falling within the scope of Formula I, which is reacted with an alkyl acrylate to produce the alkyl acrylate copolymers. When subsequently reacted with a monomeric silane or polysiloxane, the silane modified alkyl acrylate copolymers have "built-in" properties, as will become evident subsequently and in many instances do not require the addition of various additives.

The water-curable, silane modified alkyl acrylate copolymers of this invention may be depicted, ideally, as containing the repeating unit of the formula:

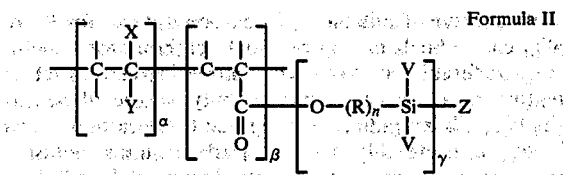

Formula II wherein X and Y are as defined in Formula I, $\alpha$, $\beta$ and $\gamma$ are integers each having a value of at least 1, R is a hydrocarbon radical or an oxy substituted hydrocarbon radical, each V, which can be the same or different is hydrogen, a hydrolyzable group or a hydrocarbon radical, Z is a hydrolyzable group, n is an integer having a value of one to 18 inclusive.

Among suitable monomers and mixtures thereof falling within the scope of Formula I, which can be reacted with alkyl acrylates to form the alkyl acrylate copolymers can be noted vinyl chloride, vinylidene chloride, styrene, acrylonitrile and the like.

Suitable alkyl acrylates and mixtures thereof, which may be copolymerized with the monomers of Formula I, fall within the scope of the following formula:

Formula III wherein $R_1$ is hydrogen or methyl and $R_2$ is alkyl having one to 8 carbon atoms. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate and the like.

Exemplary of suitable alkyl acrylate copolymers are: copolymer of vinyl chloride and ethyl acrylate, copolymer of vinylidene chloride and ethyl acrylate, copolymer of acrylonitrile and ethyl acrylate, copolymer of styrene and ethyl acrylate, copolymer of vinyl chloride, vinylidene chloride and 2-ethylhexyl acrylate, copolymer of vinyl chloride, acrylonitrile and butyl acrylate and the like.

Alkyl acrylate copolymers are known materials being described, for example, in *Vinyl And Related Polymers—Their Preparation, Properties And Application In Rubbers, Plastics, Fibers, And In Medical And Industrial Arts,*

Calvin E. Schildknecht, J. Wiley & Son, Inc., New York, 1952.

In one aspect of the present invention a silane modified copolymer is produced by reacting a mixture containing an alkyl acrylate copolymer and a polysiloxane containing repeating units of the formula:

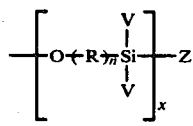

Formula IV wherein as previously stated, R is a hydrocarbon radical or oxy substituted hydrocarbon radical, each V, which can be the same or different, is hydrogen, a hydrocarbon radical or a hydrolyzable group, Z is a hydrolyzable group; n is an integer having a value of one to 18 inclusive and x is an integer having a value of at least 2, generally 2 to 1000 inclusive, preferably 5 to 25 inclusive.

Illustrative of suitable hydrocarbon radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methoxymethyl, methyloxypropyl, ethyloxyethyl, ethyloxypropyl, propyloxypropyl, propyloxybutyl, propyloxyhexyl and the like.

As stated, each V can be hydrogen, a hydrocarbon radical or a hydrolyzable group. Illustrative of suitable hydrocarbon radicals are alkyl radicals having one to 18 carbon atoms, preferably one to 6 carbon atoms inclusive such as methyl, ethyl, n-propyl, isopropyl, n-butyl, n-hexyl and the like; alkoxy radicals having one to 18 carbon atoms inclusive, preferably one to 6 carbon atoms inclusive, such as methoxy, ethoxy, propoxy, hexoxy, dodecyloxy, methoxyethoxy and the like; aryl radicals having 6 to 8 carbon atoms inclusive such as phenyl, methyl phenyl, ethyl phenyl and the like, cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals as previously described for R; oxy aryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill patented Oct. 29, 1968.

Polysiloxanes having repeating units falling within the scope of Formula I can be prepared as described in U.S. Pat. No. 3,193,567 to Gerd Rossmy patented July 6, 1965 or by condensing and polymerizing a silane falling within the scope of Formula V in the presence of a metal carboxylate or an organo titanate as described in my copending application Ser. No. 192,319.

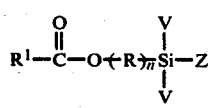

Formula V wherein R¹ is a hydrocarbon radical, as for example an alkyl radical having one to 18 carbon atoms inclusive, preferably one to four carbon atoms inclusive such as methyl, ethyl, n-propyl, isopropyl, n-butyl and the like; alkylene radicals having two to 18 carbon atoms inclusive, preferably two to 4 carbon atoms inclusive such as ethylene, propylene and the like; aryl radicals having six to ten carbon atoms inclusive such as phenyl, benzyl and the like. Other variables are as previously defined.

Exemplary of suitable silanes falling within the scope of Formula V are the following:

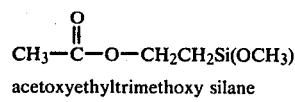

acetoxyethyltrimethoxy silane

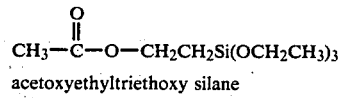

acetoxyethyltriethoxy silane

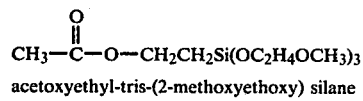

acetoxyethyl-tris-(2-methoxyethoxy) silane

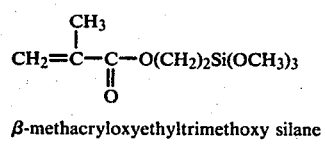

β-methacryloxyethyltrimethoxy silane

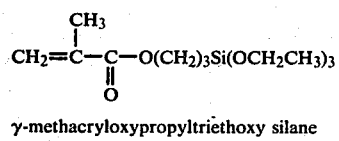

γ-methacryloxypropyltriethoxy silane

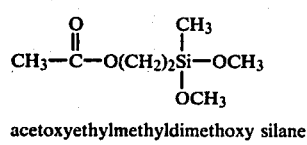

acetoxyethylmethyldimethoxy silane

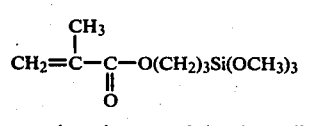

γ-methacryloxypropyltrimethoxy silane

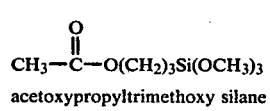

acetoxypropyltrimethoxy silane

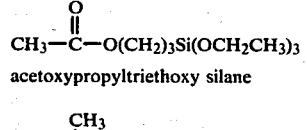

acetoxypropyltriethoxy silane

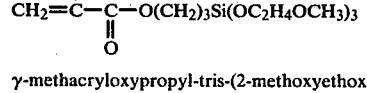

γ-methacryloxypropyl-tris-(2-methoxyethoxy) silane

Preferred polysiloxanes, for purposes of this invention, contain epeating units falling within the scope of Formula IV and have combined therein an organo titanate. The organo titanate modified polysiloxanes can be used as such, without the use of additional organo titanate catalyst, to react with the alkyl acrylate copolymers.

The preferred polysiloxanes have a viscosity of about 0.5 poise to about 150 poise, preferably about one to about 20 poise as determined by a Gardner-Holdt bubble viscometer at a temperature of 25° C.

Organo titanate modified polysiloxanes can be prepared by reacting a mixture containing a silane falling within the scope of Formula V with an organo titanate falling within the scope of Formula VI $$Ti(OR^2)_4 \qquad \text{Formula VI}$$

wherein each $R^2$, which can be the same or different, is hydrogen or a hydrocarbon radical having one to 18 carbon atoms inclusive, preferably one to 14 carbon atoms inclusive, provided that at least one $R^2$ is a hydrocarbon radical.

Exemplary of suitable hydrocarbon radicals are alkyl radicals such as methyl, ethyl, n-propyl, isopropyl, butyl, octyl, lauryl, myristyl, stearyl and the like, cycloaliphatic radicals such as cyclopentyl, cyclohexyl and the like, aryl radicals such as phenyl, methylphenyl, chlorophenyl and the like; alkaryl radicals such as benzyl and the like.

Particularly desirable titanates falling within the scope of Formula VI are those wherein each $R^2$ is alkyl having one to 18 carbon atoms inclusive, preferably one to 14 carbon atoms inclusive, exemplified by tetrabutyl titanate, tetraisopropyl titanate and the like.

Organo titanates falling with the scope of Formula VI are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

The preparation of a silane modified copolymer of an alkyl acrylate can be carried out by reacting a polysiloxane, as described, with an alkyl acrylate copolymer, as described, in the presence of an organo titanate catalyst.

In those instances wherein the polysiloxane contains combined organo titanate, additional organo titanate catalyst may not be necessary, especially when at least about 0.5 percent by weight organo titanate, based on the weight of the monomeric silane, was used in the preparation of the polysiloxane.

The amount of organo titanate catalyst added to the reaction mixture is a catalytic amount, sufficient to catalyze the reaction between the polysiloxane and the copolymer. A preferred amount is from about 0.001 to about 50 percent by weight, most preferably about 0.1 to about 25 percent by weight based on the weight of the polysiloxane.

The amount of polysiloxane used can vary from about 0.05 to about 10 and, preferably about 0.3 to about 5 percent by weight based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred and in the presence of solvents.

Completion of the reaction is evidenced by measurement of no further viscosity change.

Recovery of the silane modified copolymer can be effected by allowing the contents of the reaction flask to cool and discharging to a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane can be added to the fluxed copolymer and the organo titanate, if needed, then added. Alternatively, the organo titanate, if needed, can be added to the copolymer prior to the addition of the polysiloxane. Also, organo titanate and polysiloxane can be premixed and added to the fluxed polymer.

Also, as stated, the water-curable, silane modified alkyl acrylate copolymers can be produced by reacting a mixture containing an alkyl acrylate copolymer and a monomeric silane falling with the scope of Formula V in the presence of an organo titanate under process conditions and amounts of reactants, catalysts and the like as previously defined with respect to the reaction of a polysiloxane and an alkyl acrylate copolymer.

The curing or crosslinking of the silane modified alkyl acrylate copolymer is effected by exposing the copolymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at significant rates in the absence of added silanol condensation catalyst. The organo titanate catayst or catalyst residues present in the production of the silane modified copolymers also catalyze the crosslinking reaction.

Alternatively, a wide variety of materials which function as silanol condensation catalysts and which are known in the art can be employed in the crosslinking process. Such materials include metal carboxylates previously described; organic bases such as ethylamine, hexylamine dibutylamine and piperidine and the like and acids such as mineral acids and fatty acids and the like.

To the silane modified copolymers of this invention may be added various additives, in amounts well known in the art, such as fillers among which can be mentioned carbon black, clay, talc, calcium silicate, calcium carbonate, silca, aluminum hydroxide and the like.

In those instances wherein it is desired, flame retardants such as decabromodiphenyl oxide, chlorinated polyethylene, and halogenated paraffin waxes, alone or in admixture with organic or inorganic antimony compounds such as antimony oxide and/or alkaline earth metal oxides, carbonates, hydroxides and sulfates can be added to the silane modified copolymers. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosure of all patents noted are incorporated herein by reference.

The following examples would serve to illustrate the present invention.

EXAMPLE 1

A. Preparation of Polysiloxane

The reaction scheme for the preparation of the polysiloxane can be depicted as follows wherein the silane monomer was acetooxyethyltrimethoxy silane:

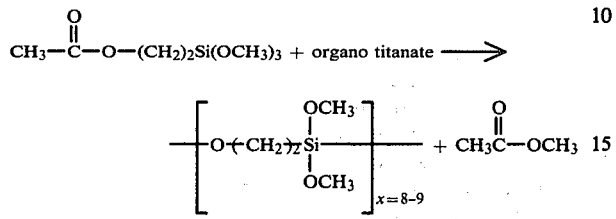

$$CH_3-\overset{O}{\underset{\|}{C}}-O-(CH_2)_2Si(OCH_3)_3 + \text{organo titanate} \longrightarrow$$

$$\left[-O-(CH_2)_2\underset{\underset{OCH_3}{|}}{\overset{\overset{OCH_3}{|}}{Si}}-\right]_{x=8-9} + CH_3\overset{O}{\underset{\|}{C}}-OCH_3$$

One hundred and four grams (0.5 mole) of acetoxyethyltrimethoxy silane were placed in a 250 ml. three-necked, round bottom flask and heated to a temperature of 75° C. under a nitrogen gas atmosphere. When the contents of the flask reached a temperature of 75° C., 1.191 grams of tetraisopropyl titanate were added thereto using a syringe. The reaction mixture was heated for three hours at a temperature of 95° C.-110° C. Volatiles evolved during the reaction and were condensed in a dry ice trap. At the end of the three hour period, the contents of the flask were cooled to room temperature, about 23° C., the residue removed from the flask, weighed and stored under argon.

| YIELD | ACTUAL | THEORETICAL | PERCENT OF THEORETICAL |
|---|---|---|---|
| Volatiles | 32.9 grams | 37 grams | 87 |
| Polysiloxane Product | 69.0 grams | 71.8 grams | 96 |

Viscosity of Polysiloxane Product - 3.4 poise

Infrared Analysis

Volatiles: strong absorption at 1685 reciprocal centimeters which is consistent with strong absorption at 1690 reciprocal centimeters for a known sample of methyl acetate Polysiloxane Product: strong absorption at 1080 reciprocal centimeters which is consistent with Si—O—CH$_3$ group; weak absorption at 1692 reciptrocal centimeters which is consistent with significant reduction of carbonyl groups.

Value of n as 8-9 is consistent with viscosity of product and amounts of volatiles recovered.

B. Preparation of Silane Modified Copolymer of Vinyl Chloride-Ethyl Acrylate A 300 cc Brabender mixer is heated to a temperature of 160° C. and is maintained Under a blanket of argon gas while there is added 244 grams of a copolymer of vinyl chloride-ethyl acrylate and 1.26 grams of 2,3-dihydro-2,3,4-trimethyl quinoline, an antioxidant. This mixture is fluxed and mixed rapidly for 2 minutes. To the fluxed mixture, there is added, by means of a syringe, 5.80 grams of a mixture of the polysiloxane of (a) and dibutyltin dilaurate. The 5.80 gram mixture contained 97 percent by weight polysiloxane and 3 percent by weight dibutyltin dilaurate. After homogeniety is reached in the Brabender, as indicated by a constant torque measurement, 1.26 grams of tetraisopropyl titanate is added to the contents of the Brabender. The contents of the Brabender are then maintained at a temperature of 160°-170° C. for a period of 30 minutes resulting in a reaction whereby the silane reacts with the vinyl chloride-ethyl acrylate copolymer as should be evidenced by an increase in torque. Volatiles which evolve during the reaction are condensed in a dry ice trap which is connected to the Brabender. At the end of the 30 minute period, the contents of the Brabender are discharged into a polyethylene bag under an atmosphere of argon.

It is to be expected that the silane modified copolymer would be water-curable and be characterized by a high degree of flame resistance, inherent plasticity, good electrical properties and improved resistance to deformation.

EXAMPLE 2

On repeating Example 1, utilizing a copolymer of vinylidene chloride and ethyl acrylate, in lieu of the vinyl chloride-ethyl acrylate copolymer, it is to be expected that the silane modified copolymer would be water-curable and be characterized by a high degree of flame resistance, inherent plasticity, good electrical properties and improved resistance to deformation.

EXAMPLE 3

On repeating Example 1, utilizing a copolymer of acrylonitrile and ethyl acrylate in lieu of the vinyl chloride-ethyl acrylate copolymer, it is to be expected that the silane modified copolymer would be water-curable and be characterized by a high degree of flame resistance, good oil resistance and improved resistance to deformation.

EXAMPLE 4

On repeating Example 1, utilizing a copolymer of styrene and ethyl acrylate, in lieu of the vinyl chloride-ethyl acrylate copolymer, it is to be expected that the silane modified copolymer would be water-curable and be characterized by inherent plasticity, improved impact strength and improved resistance to deformation.

EXAMPLE 5

On repeating Example 1, utilizing a copolymer of vinyl chloride-vinylidene chloride and 2-ethylhexyl acrylate, in lieu of the vinyl chloride-ethyl acrylate copolymer, it is to be expected that the silane modified copolymer would be water-curable and be characterized by inherent plasticity, improved toughness and a high degree of flame resistance.

EXAMPLE 6

On repeating Example 1, utilizing a copolymer of vinyl chloride, acrylonitrile and butyl acrylate, in lieu of the vinyl chloride-ethyl acrylate copolymer, it would be expected that the silane modified copolymer would be water-curable and be characterized by inherent plasticity, superior oil resistance and a high degree of flame resistance.

What is claimed is:

1. A composition of matter comprising a silane of the formula:

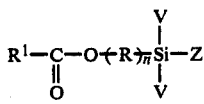

or a polysiloxane containing repeating units of the formula:

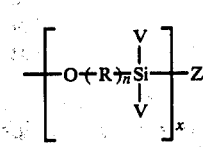

wherein $R^1$ is a hydrocarbon radical, R is a hydrocarbon radical or an oxy substituted hydrocarbon radical, each V is hydrogen, a hydrocarbon radical or a hydrolyzable group, Z is a hydrolyzable group, n is an integer having a value of 1 to 18 and x is an integer having a value of at least 2; a copolymer of an alkyl acrylate and a monomer having the formula:

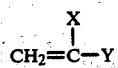

wherein X is hydrogen or chlorine, Y is chlorine, a phenyl radical or cyano; and an organo titanate.

2. A composition of matter comprising a silane of the formula:

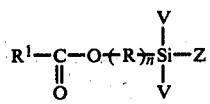

wherein $R^1$ is a hydrocarbon radical, R is a hydrocarbon radical or an oxy substituted hydrocarbon radical, each V is hydrogen, a hydrocarbon radical or a hydrolyzable group, Z is a hydrolyzable group and n is an integer having a value of 1 to 18; a copolymer of an alkyl acrylate and a monomer having the formula:

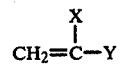

wherein X is hydrogen or chlorine, Y is chlorine, a phenyl radical or cyano; and an organo titanate.

3. A composition of matter comprising a polysiloxane containing repeating units of the formula:

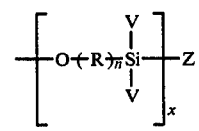

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 and x is an integer having a value of at least 2; a copolymer of an alkyl acrylate and a monomer having the formula:

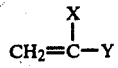

wherein X is hydrogen or chlorine and Y is chlorine, a phenyl radical or cyano; and an organo titanate.

4. A composition of matter as defined in claim 3 wherein x is an integer having a value of 2 to 1000.

5. A composition of matter as defined in claim 3 wherein x is an integer having a value of 5 to 25.

6. A composition of matter as defined in claim 3 wherein R is an alkylene radical, each V is an alkoxy radical, Z is an alkoxy radical and the organo titanate has the formula:

wherein each $R^2$ is hydrogen or a hydrocarbon radical having one to 18 carbon atoms provided that at least one $R^2$ is a hydrocarbon radical.

7. A composition of matter as defined in claim 3 wherein the said copolymer is a copolymer of vinyl chloride and ethyl acrylate and said polysiloxane is derived from acetoxyethyltrimethoxy silane.

8. A composition of matter as defined in claim 3 wherein said copolymer is a copolymer of vinylidene chloride and ethyl acrylate and said polysiloxane is derived from acetoxyethyltrimethoxy silane.

9. A composition of matter as defined in claim 3 wherein said copolymer is a copolymer of acrylonitrile and ethyl acrylate and said polysiloxane is derived from acetoxyethyltrimethoxy silane.

10. A composition of matter as defined in claim 3 wherein said copolymer is a copolymer of vinyl chloride, vinylidene chloride and 2-ethylhexyl acrylate and said polysiloxane is derived from acetoxyethyltrimethoxy silane.

11. A composition of matter as defined in claim 3 wherein said copolymer is a copolymer of styrene and ethyl acrylate and said polysiloxane is derived from acetoxyethyltrimethoxy silane.

12. A composition of matter as defined in claim 3 wherein said organo titanate is tetraisopropyl titanate.

13. A water-curable, silane modified copolymer of an alkyl acrylate and a monomer of the formula:

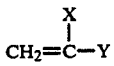

wherein X is hydrogen or chlorine and Y is chlorine, a phenyl radical or cyano, obtained from a composition defined in claim 1.

14. A water-curable, silane modified copolymer of an ethyl or butyl acrylate and a monomer of the formula:

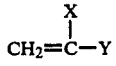

wherein X is hydrogen or chlorine and Y is chlorine, a phenyl radical or cyano, obtained from a composition defined in claim 1.

15. A water-curable, silane modified copolymer as defined in claim 13 wherein said alkyl acrylate is ethyl acrylate or methyl acrylate.

16. A water-curable, silane modified copolymer as defined in claim 13 wherein said alkyl acrylate is butyl acrylate.

17. A water-curable, silane modified copolymer as defined in claim 13 wherein said alkyl acrylate is 2-ethyl hexyl acrylate.

18. A water-curable silane modified copolymer as defined in claim 13 or 14 wherein said silane is derived from acetoxyethyltrimethoxy silane.

19. A water-curable, silane modified copolymer as defined in claim 13 or 14 wherein said monomer is vinyl chloride.

20. A water-curable, silane modified copolymer as defined in claim 13 or 14 wherein said monomer is styrene.

21. A water-curable, silane modified copolymer as defined in claim 13 or 14 wherein said monomer is acrylonitrile.

22. A water-curable, silane modified copolymer as defined in claim 13 or 14 wherein said monomer is a mixture of vinyl chloride and acrylonitrile.

23. A water-curable, silane modified copolymer as defined in claim 13 or 14 wherein said monomer is vinylidene chloride.

24. A process of producing a water-curable, silane modified alkyl acrylate copolymer which comprises reacting a mixture containing a silane of the formula:

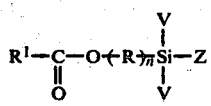

or a polysiloxane derived from said monomer wherein $R^1$ is a hydrocarbon radical, R is a hydrocarbon radical or oxy substituted hydrocarbon radical, each V is hydrogen, a hydrocarbon radical or a hydrolyzable group, Z is a hydrolyzable group, n is an integer having a value of 1 to 18; a copolymer of an alkyl acrylate and a monomer having the formula:

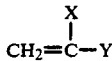

wherein X is hydrogen or chlorine, Y is chlorine, a phenyl radical or cyano, and an organo titanate.

25. The crosslinked product of the silane modified copolymer of claim 13.

26. An electrical conductor having as a jacketing or insulation thereabout the silane modified copolymer or the crosslinked product of the silane modified copolymer defined in claim 13.

27. A process of producing a water-curable, silane modified alkyl acrylate copolymer which comprises reacting a mixture containing a polysiloxane containing repeating units of the formula:

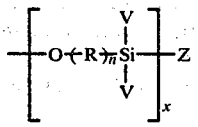

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 and x is an integer having a value of at least 2; a copolymer of an alkyl acrylate

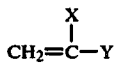

wherein X is a hydrogen or chlorine and Y is chlorine, a phenyl radical or cyano; and an organo titanate.

28. A composition of matter as defined in claim 3 wherein said copolymer is a copolymer of vinyl chloride, acrylonitrile and butyl acrylate and said polysiloxane is derived from acetoxyethyltrimethoxy silane.

* * * * *

UNITED STATES PATENT AND TRADEMARK OFFICE
CERTIFICATE OF CORRECTION

PATENT NO. : 4,434,272
DATED : February 28, 1984
INVENTOR(S) : Michael J. Keogh

It is certified that error appears in the above—identified patent and that said Letters Patent is hereby corrected as shown below:

Column 4, line 63, "epeating" should read -- repeating --

Column 6, line 55, "silca" should read -- silica --

Column 6, line 67, "disclosure" should read -- disclosures --

Column 7, lines 48 and 49, "reciptrocal" should read -- reciprocal --

Column 8, line 1, "is" should read -- are --

Claim 27, sixth line after the first formula, after "acrylate" insert
-- and a monomer having the formula --

Signed and Sealed this

Twenty-sixth Day of June 1984

[SEAL]

Attest:

GERALD J. MOSSINGHOFF

Attesting Officer      Commissioner of Patents and Trademarks